US 6,343,671 B1

(12) United States Patent
Ackermann et al.

(10) Patent No.: US 6,343,671 B1
(45) Date of Patent: Feb. 5, 2002

(54) ACTUATOR FOR GENERATING AN ADDITIONAL STEERING ANGLE FOR ROAD VEHICLES

(75) Inventors: Jürgen Ackermann, Herrsching; Tilmann Bünte; Johannes Dietrich, both of Gilching; Bernd Gombert, Grafrath; Bertram Willberg, Schöngeising, all of (DE)

(73) Assignee: Deutsches Zentrum fur Luft-und Raumfahrt E.V., Bonn (DE)

( * ) Notice: Subject to any disclaimer, the term of this patent is extended or adjusted under 35 U.S.C. 154(b) by 0 days.

(21) Appl. No.: 09/192,491

(22) Filed: Nov. 17, 1998

(30) Foreign Application Priority Data

Nov. 17, 1997 (DE) .......................... 197 50 585

(51) Int. Cl.[7] .............................. B62D 5/04
(52) U.S. Cl. ....................... 180/444; 180/443
(58) Field of Search ................ 180/444, 443; 74/89.15, 424.8 R, 459

(56) References Cited

U.S. PATENT DOCUMENTS

| 3,884,090 | A | * | 5/1975 | Dock .................. 74/424.8 R |
| 4,576,057 | A | * | 3/1986 | Saari .................. 74/424.8 R |
| 4,741,409 | A | | 5/1988 | Westercamp et al. |
| 4,834,202 | A | * | 5/1989 | Shimizu .................. 180/444 |
| 4,880,074 | A | | 11/1989 | Matsumoto |
| 4,987,963 | A | | 1/1991 | Oslapas et al. |
| 5,370,012 | A | * | 12/1994 | Stanley .................. 74/424.8 R |
| 5,375,057 | A | | 12/1994 | Ackermann |
| 5,428,536 | A | | 6/1995 | Ackermann |
| 5,515,275 | A | | 5/1996 | Ackermann |
| 5,762,162 | A | * | 6/1998 | Bodtker .................. 180/444 |
| 5,836,208 | A | * | 11/1998 | Dietrich et al. ......... 74/424.8 R |
| 5,921,344 | A | * | 7/1999 | Boyer .................. 180/444 |
| 5,925,083 | A | | 7/1999 | Ackermann |

FOREIGN PATENT DOCUMENTS

| DE | 68903095 | 3/1993 |
| DE | 19540634 | 3/1997 |
| DE | 19545379 | 4/1997 |
| EP | 0528200 | 2/1993 |

* cited by examiner

Primary Examiner—Robert P. Olszewski
Assistant Examiner—Michael Cuff
(74) Attorney, Agent, or Firm—Browdy and Neimark

(57) ABSTRACT

To create an additional steering angle for a vehicle, an actuator having a microprocessor-controlled electric motor functioning as the drive and a gear driven by said electric motor, is used to apply to the wheels the additional steering angle at the vehicle axle. The gear is a known constant-pitch planetary rolling-contact threaded-spindle gear (constant-pitch PRCTS gear) (12), consisting of a spindle rod (16), a spindle nut (14) surrounding the former, and a number of interposed rollers or rolling elements (18) with a groove profile (19) matching the thread (17) of the spindle rod (16). The rollers or rolling elements (18) are run on a number of guide rings (20) and interposed bearings (20), and placed at a fixed predetermined distance relative to the spindle nut (14) and to one another.

The spindle rod (16) concurrently functions as the axis of the electric motor and is placed inside an electric motor rotor (9'). The constant-pitch PRCTS gear (12) furthermore has assigned sensor means with control-engineering type feedback to determine the position of the spindle rod (12).

4 Claims, 11 Drawing Sheets

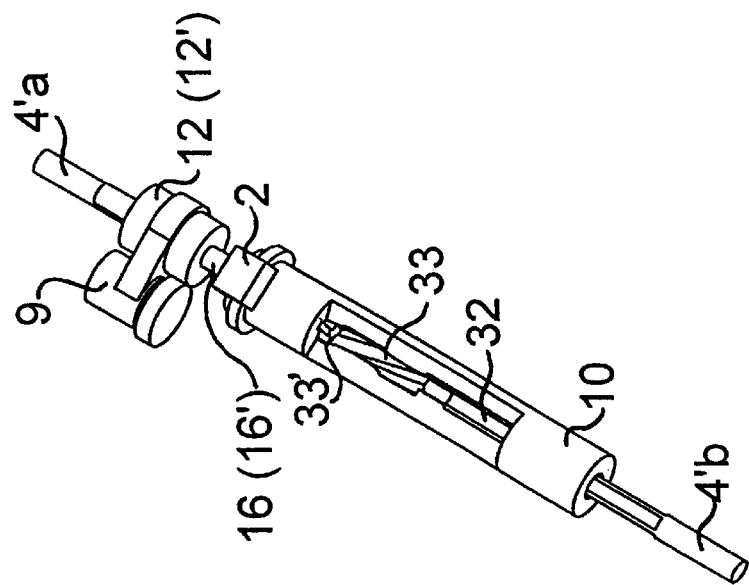
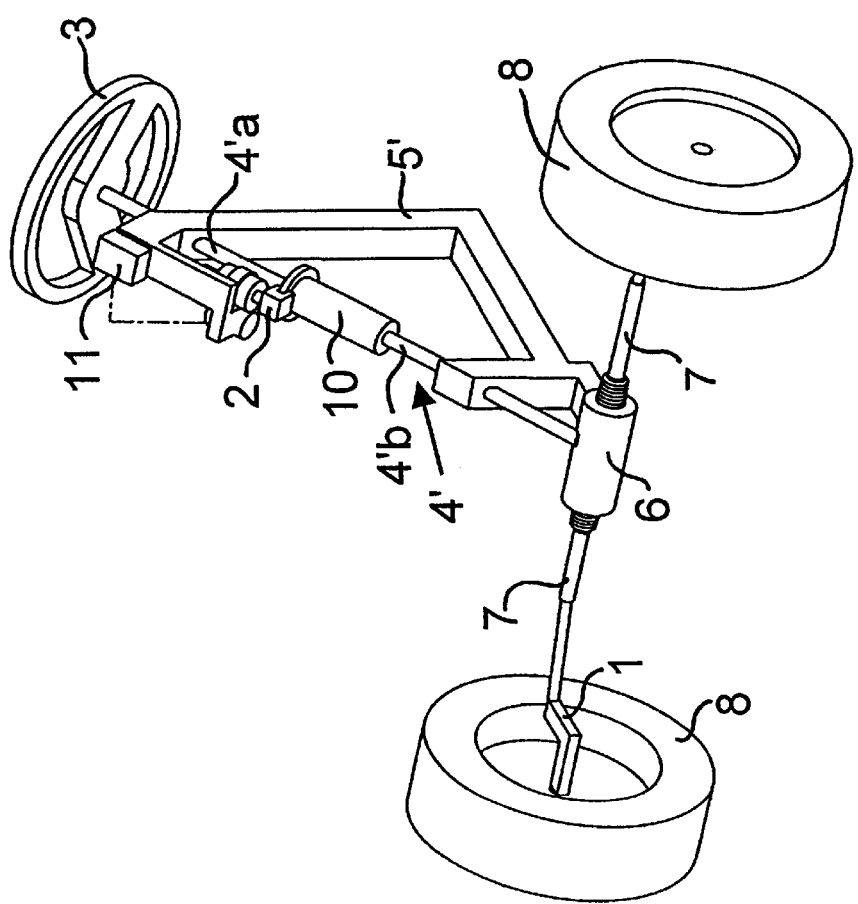
Fig.6b
Fig.6a

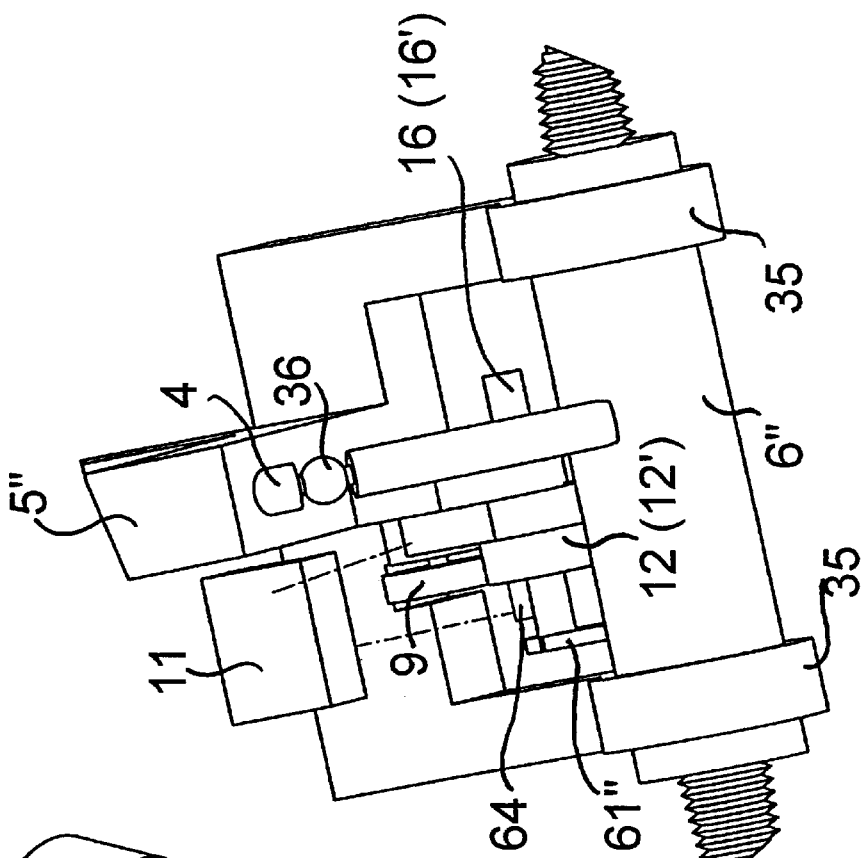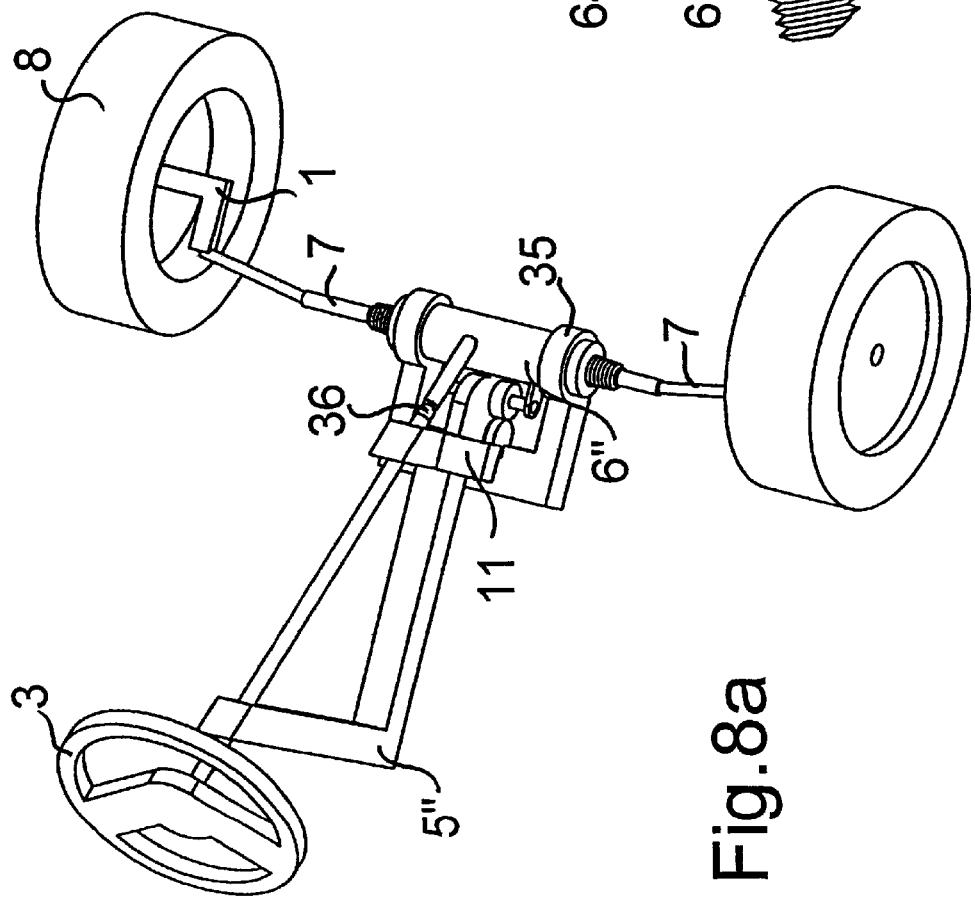

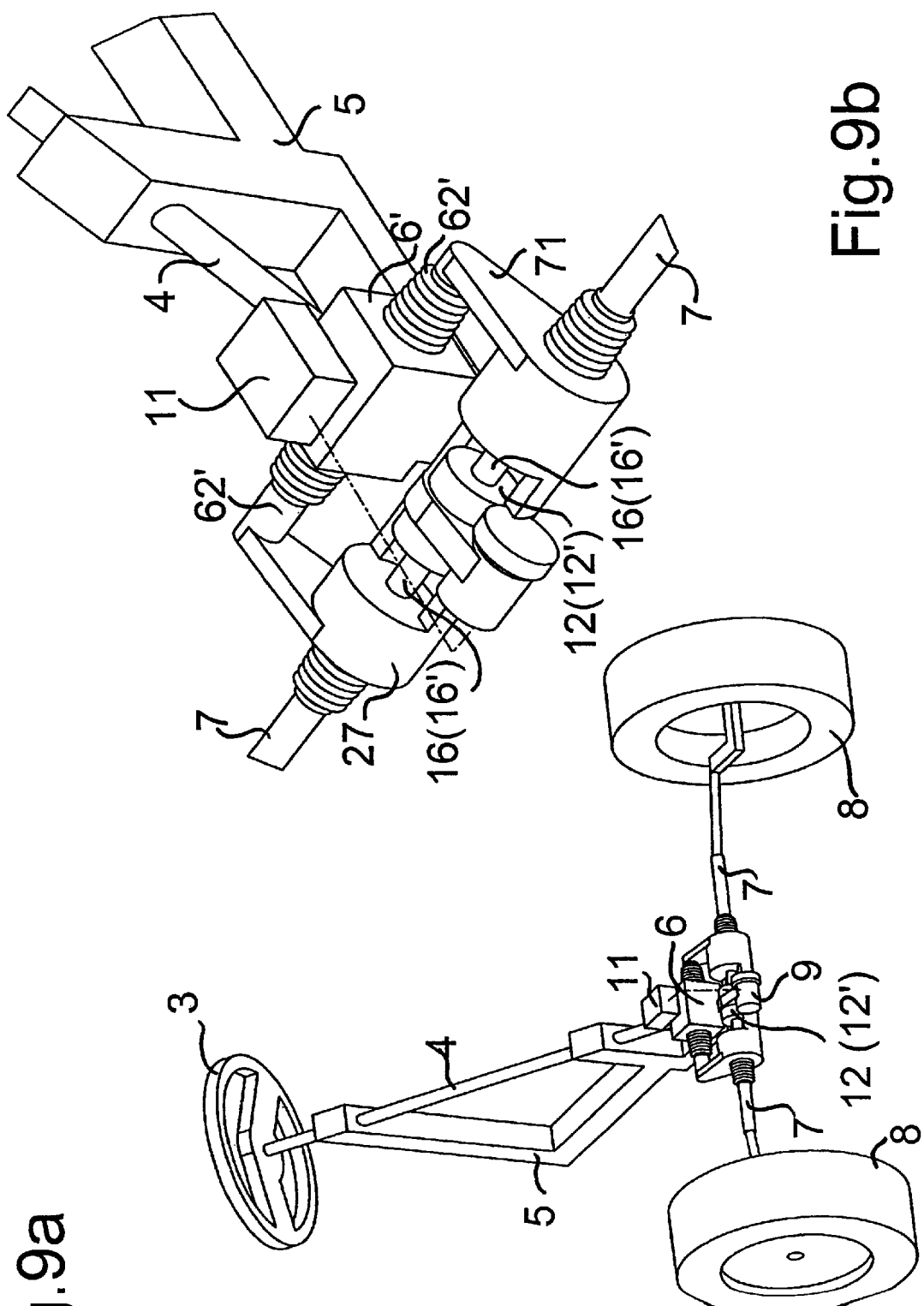

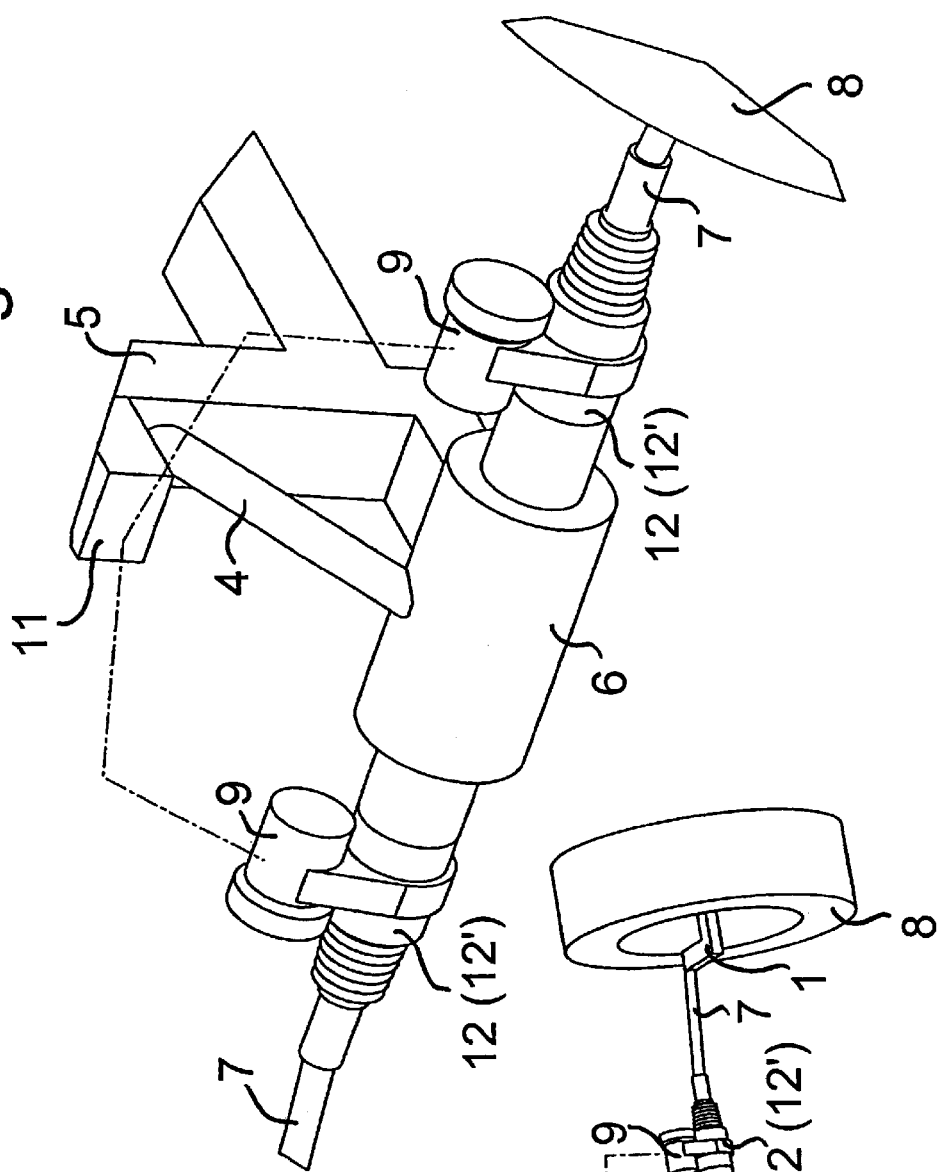
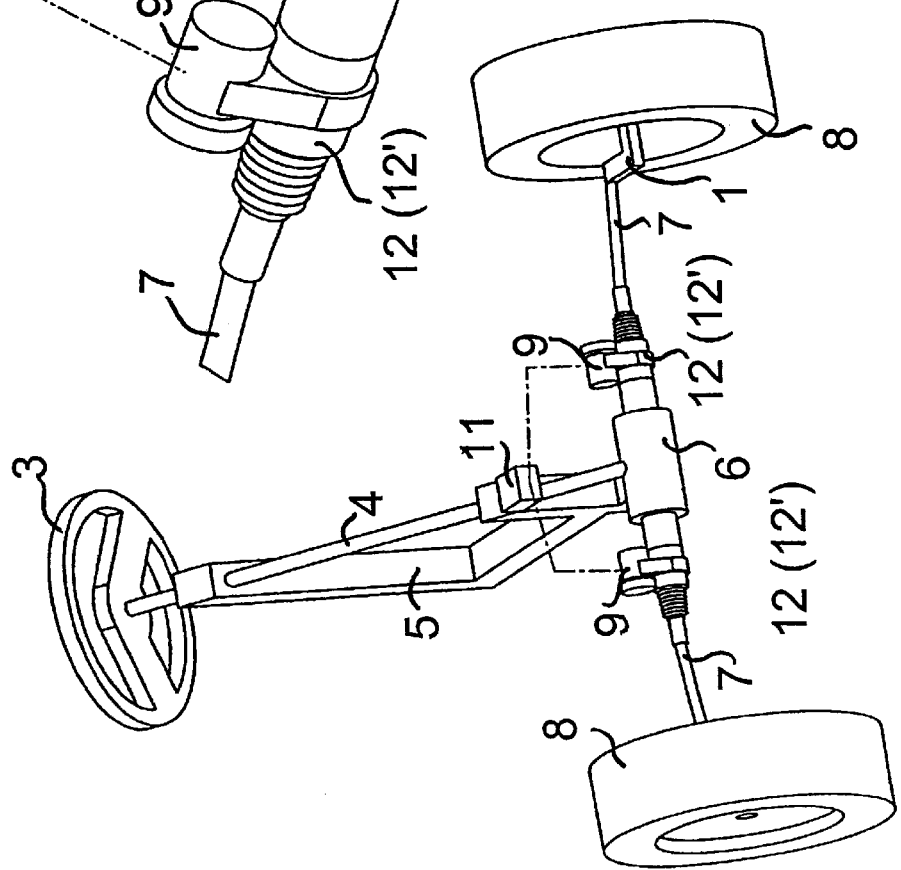

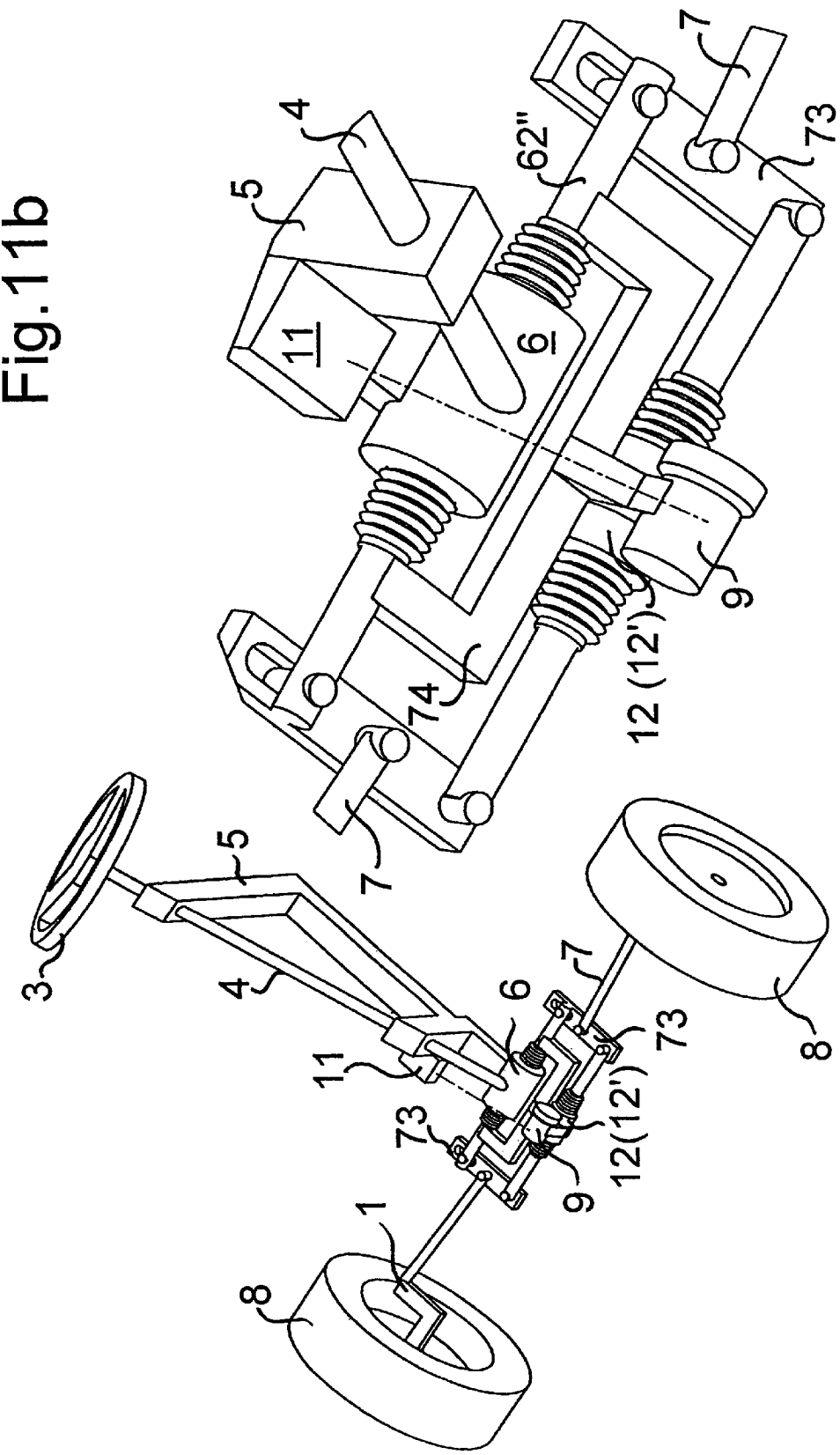

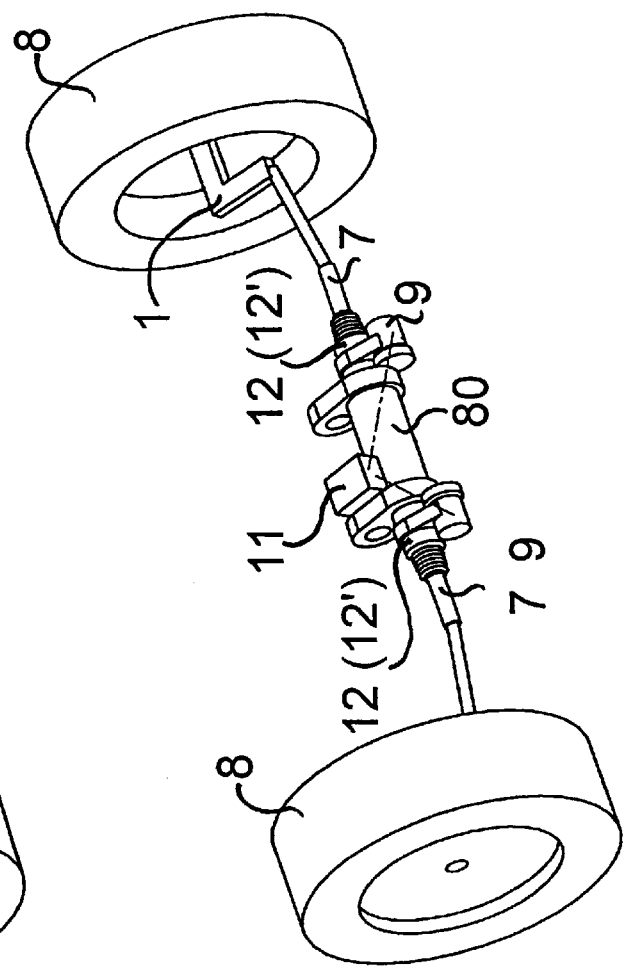
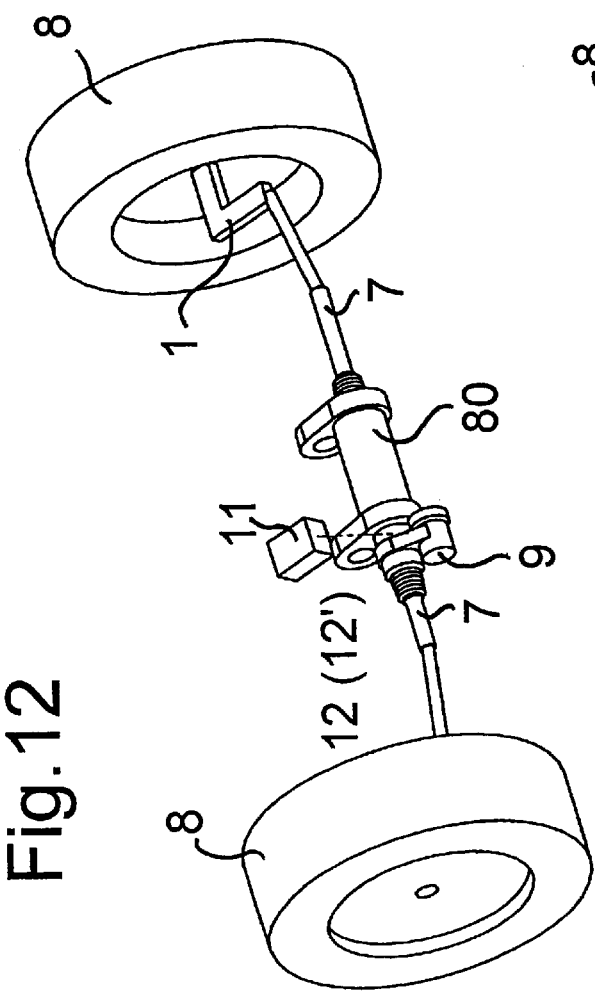

ACTUATOR FOR GENERATING AN ADDITIONAL STEERING ANGLE FOR ROAD VEHICLES

BACKGROUND OF THE INVENTION

1. Technical Field of the Invention

The present invention relates to an actuator for generating an additional steering angle for road vehicles, having a microprocessor-controlled electric motor functioning as a drive unit, and a gear, which is driven by this electric motor, to apply the additional steering angle to a steered front axle and/or to a rear axle of a vehicle.

2. Prior Art

In conventional steering assemblies for road vehicles like passenger cars, trucks, busses, etc., the steering angle is maintained at the steered axle by means of a mechanically rigid connection from the steering wheel to a steering gearbox and steering tie rods at the wheels. These systems usually employ a steering gearbox that uses a fixed ratio to convert a change in the steering wheel angle into a translatory movement of the steering tie rods. The movement of the steering tie rods, in turn, is converted via steering knuckle arms into the steering angle at the wheels.

In some designs of recent years the steering characteristics of a vehicle are altered by selectively influencing the steering angle. Examples include variable steering reduction ratios, but also control-engineering techniques to improve the dynamics of vehicle movement. In these methods, the characteristics of the dynamics of vehicle movement are measured, or determined by other means, and subsequently compared to corresponding desired values. The difference is then used to determine an appropriate steering angle, as required. The desired values of the dynamics of vehicle movement are generally determined from the steering wheel angle and other parameters, like driving speed, etc., since the steering wheel angle corresponds to the driver's desires regarding the vehicle's lateral and yaw dynamics.

With this approach, the obvious solution appears to be a so-called "steer-by-wire" solution, whereby a steering angle is calculated in a microprocessor on the basis of all relevant variables, and ultimately transferred by an actuator to the wheels of the steered axle. However, this approach raises considerable safety concerns. Unless appropriate, highly complex safety measures are taken, the vehicle will become unsteerable if a system of the described type malfunctions.

For this reason, the aim in many cases is to retain the mechanical connection between the steering wheel and the wheels of the steered axle and to merely add an additional steering angle mechanically. This additional steering angle results from the difference between a steering angle calculated by a microprocessor, and the steering angle obtained from the position of the steering wheel. A device that is used to perform the mechanical addition of the steering angles will hereinafter be referred to as an auxiliary steering system, for reasons of brevity.

The auxiliary steering system can alternatively be positioned
  before the steering gearbox, i.e., in the area of the steering column,
  within the steering gearbox, or
  following the steering gearbox, i.e., in the area of the steering tie rods or steering knuckle arms.

In case of a failure of the auxiliary steering system, the conventional behavior of the steering assembly is restored simply by blocking the auxiliary steering system, so that the safety of the steering system is not compromised.

The demands placed on auxiliary steering systems vary depending on their intended application. Generally, however, the following characteristics are expected:
  a high degree of reliability;
  sufficient dynamic characteristics, i.e., a sufficient bandwidth and actuator speed. (The term bandwidth as defined for linear low-pass units describes the frequency at which the logarithmic amplitude response has dropped by −3 dB from the horizontal initial amplitude. The bandwidth hence is a measure of up to which frequency an actuator can transfer the required steering angle with sufficient accuracy.)
  zero backlash;
  little friction;
  low construction volume and weight;
  low power consumption;
  robustness with respect to mechanical loads, like forces, impacts etc.;
  depending on the location of its installation: insensitivity to dirt
  meet the automobile industry's demand for low unit cost prices.

For auxiliary steering systems, designs are known, which differ regarding their point of application (see above list), the principle of the mechanical path or angle addition, and the installed actuator type (e.g., hydraulic actuator, electric motor drive).

None of the above designs meets all of the above requirements. If, for example, a hydraulic actuator is used within or following the steering gearbox, a high dynamic bandwidth can be attained only with a very large construction volume and with large line cross sections and the associated high costs. Other versions, in which electric motor driven differential angle gears (planetary gears or differential gears), for example, are installed in the divided steering column, have the disadvantage that this results either in a reversal of the direction of rotation, or in a gear ratio increase that is not equal to one, thus necessitating corresponding compensation measures (re-design of the remaining steering train). These types of gearboxes furthermore bring play and friction into the steering assembly, with the result that the driver's feeling for the steering control at the steering wheel is rendered less precise.

The present trend in the automobile industry is generally away from the hydraulic systems and toward electrical systems for (power) steering systems, brakes and other auxiliary systems. This is justified by the resulting power savings, since electrical systems require driving power only when an actuation takes place, whereas, in contrast, in hydraulic systems a hydraulic pump runs continually to supply the hydraulic pressure, which needs to be maintained at all times.

Beside the above systems, which are designed to improve the dynamics of vehicle movement by correcting a steering angle that is set by the steering wheel, it has also been suggested to impress an additional steering angle on one of the other vehicle axles, in lieu of correcting the steering angle at the axle that is mechanically steered from the steering wheel. For example, systems are known in otherwise conventionally steered passenger cars, whereby an additional steering angle is applied to the rear axle to reduce the variable angle during cornering.

With these types of systems it is necessary to make the wheels of the corresponding axle steerable. These systems therefore differ from the above systems in that the steering angle set by the steering wheel is not mechanically added to the auxiliary steering angle that is calculated by the microprocessor, but instead only the steering angle calculated by the microprocessor is applied to the respective axle via an appropriate actuator. As far as the use of an actuator is concerned, there is no difference between the systems. The latter design can actually be considered a special case of the former in that merely the steering angle portion that is created mechanically by the steering wheel is eliminated.

In the following discussion, a differentiation is therefore not always made between these two cases. Rather, the terms auxiliary steering angle and/or additional steering angle are used to refer to both, a correcting steering angle that is added to a steering angle applied mechanically by the steering wheel, and a steering angle that is applied to the axle that is not steered mechanically by the steering wheel. Specifically, the same requirements that apply to the first-described auxiliary steering systems also apply to the actuator of the latter design. None of the known versions meets all of these requirements.

OBJECT AND SUMMARY OF THE INVENTION

The invention is therefore based on the object of creating an actuator for the generation of an additional steering angle for road vehicles, which can be used with different principles of path or angle addition and at different points of application while preventing the shortcomings of the above-described approaches.

In accordance with the invention, this object is accomplished with an actuator for generating an additional steering angle for road vehicles, by using as the gear either a known constant-pitch planetary rolling-contact threaded-spindle gear (constant-pitch PRCTS gear, or a known planetary rolling-contact threaded-spindle (PRCTS) gear, with assigned sensor means with control-engineering type feedback to determine the position of the spindle rod. Advantageous designs, improvements and possible applications of the actuator in accordance with the invention, as well as its use for applying an auxiliary steering angle toan axle that is not steered mechanically by a steering wheel, are also objects of the invention.

With the use according to the invention of the constant-pitch planetary rolling-contact threaded-spindle gear (for the sake of simplicity hereinafter referred to as constant-pitch PRCTS gear) known from DE 195 40 634 (U.S. Ser. No. 08/741,042) or the planetary rolling-contact threaded-spindle gear (for the sake of simplicity hereinafter referred to as PRCTS gear) known from DE 37 39 059 (U.S. Pat. No. 4,926,708), a fast rotary motion of an electric motor serving as the drive unit can be converted at a low torque into an axial movement with very high force, so that the force required to actuate an additional steering angle can optionally be achieved in a single gear step. This use of the PRCTS gear or the constant-pitch PRCTS gear therefore makes it possible to attain very small system increases that cannot be achieved with other spindle types, because of their principle of operation.

The constant-pitch PRCTS gear permits a power transmission at a constant pitch, thus making it possible to draw conclusions regarding the variables of the spindle rod, such as force, position and acceleration, from the known and/or measurable variables of the electric motor and/or motor-driven parts of the spindle gear, such as electric current, angular position, angular velocity, angular acceleration, torque etc.

With the known PRCTS gear, due to its principle of operation, the transmission of the tangential forces from a spindle rod to rollers or rolling elements, and from there to a spindle nut is affected by slip, with the result that the PRCTS gear has a pitch that is not accurately defined and consequently also does not have a constant transmission ratio. For the operation of an auxiliary steering system, however, the additional steering angle and hence the position of the spindle rod of the PRCTS gear must be known. To ensure that the position of the spindle rod can also be set via the electric motor in an accurately defined manner if a PRCTS gear is used, according to the invention the PRCTS gear has an assigned position-sensor means with control-engineering type feedback.

The actuator according to the invention has an installed compact electric motor, which has a low weight and small construction volume and can therefore be installed directly on conventional steering gearboxes or assigned to same. According to a preferred embodiment of the invention, the spindle rod of a PRCTS gear or constant-pitch PRCTS gear concurrently serves as the axle of the electric motor and is installed inside the rotor.

The actuator according to the invention thus has a particularly compact and light-weight design and, specifically, a fixed, constant transfer ratio. Furthermore, the actuator according to the invention consists of only a few components. Lastly, the actuator according to the invention has a high efficiency due to the low occurring friction losses.

BRIEF DESCRIPTION OF THE DRAWINGS

The invention is described in detail below, based on preferred embodiments, with reference to the enclosed drawings, in which:

FIG. 3b shows a sectional view along a line III—III in FIG. 3a;

FIG. 6a shows a perspective schematic rendering of a steering assembly with a first embodiment of an auxiliary steering system;

FIG. 6b shows an enlarged, partly cut open illustration of the auxiliary steering system in FIG. 6a;

FIG. 8a shows a perspective schematic illustration of a steering assembly with a third embodiment of an auxiliary steering system assigned to a conventional steering gearbox;

FIG. 8b shows an enlarged illustration of the third embodiment of an auxiliary steering system according to FIG. 8a, assigned to a conventional steering gearbox;

FIG. 9a shows a perspective schematic illustration of a steering assembly with a fourth embodiment of an auxiliary steering system assigned to a conventional steering gearbox;

FIG. 9b shows a perspective enlarged illustration of the fourth embodiment of the auxiliary steering system assigned to the steering gearbox of FIG. 9a;

FIG. 10a shows a perspective schematic illustration of a steering assembly of a fifth embodiment of an auxiliary steering system assigned to a conventional steering gearbox;

FIG. 10b shows a perspective enlarged illustration of the fifth embodiment of the auxiliary steering system assigned to the steering gearbox of FIG. 10a;

FIG. 11a shows a perspective schematic rendering of a steering assembly with a sixth embodiment of an auxiliary steering system installed following a conventional steering gearbox;

FIG. 11b shows a perspective enlarged illustration of the sixth embodiment of the auxiliary steering system installed following the steering gearbox of FIG. 11a;

FIG. 12 shows a perspective schematic illustration of an axle which can be steered exclusively by assigning an actuator according to the invention;

FIG. 13 is a perspective schematic illustration of an axle whose wheels can be steered independently of one another, exclusively by assigning an actuator according to the invention.

DETAILED DESCRIPTION OF THE PREFERRED EMBODIMENTS OF THE INVENTION

Figure 1:
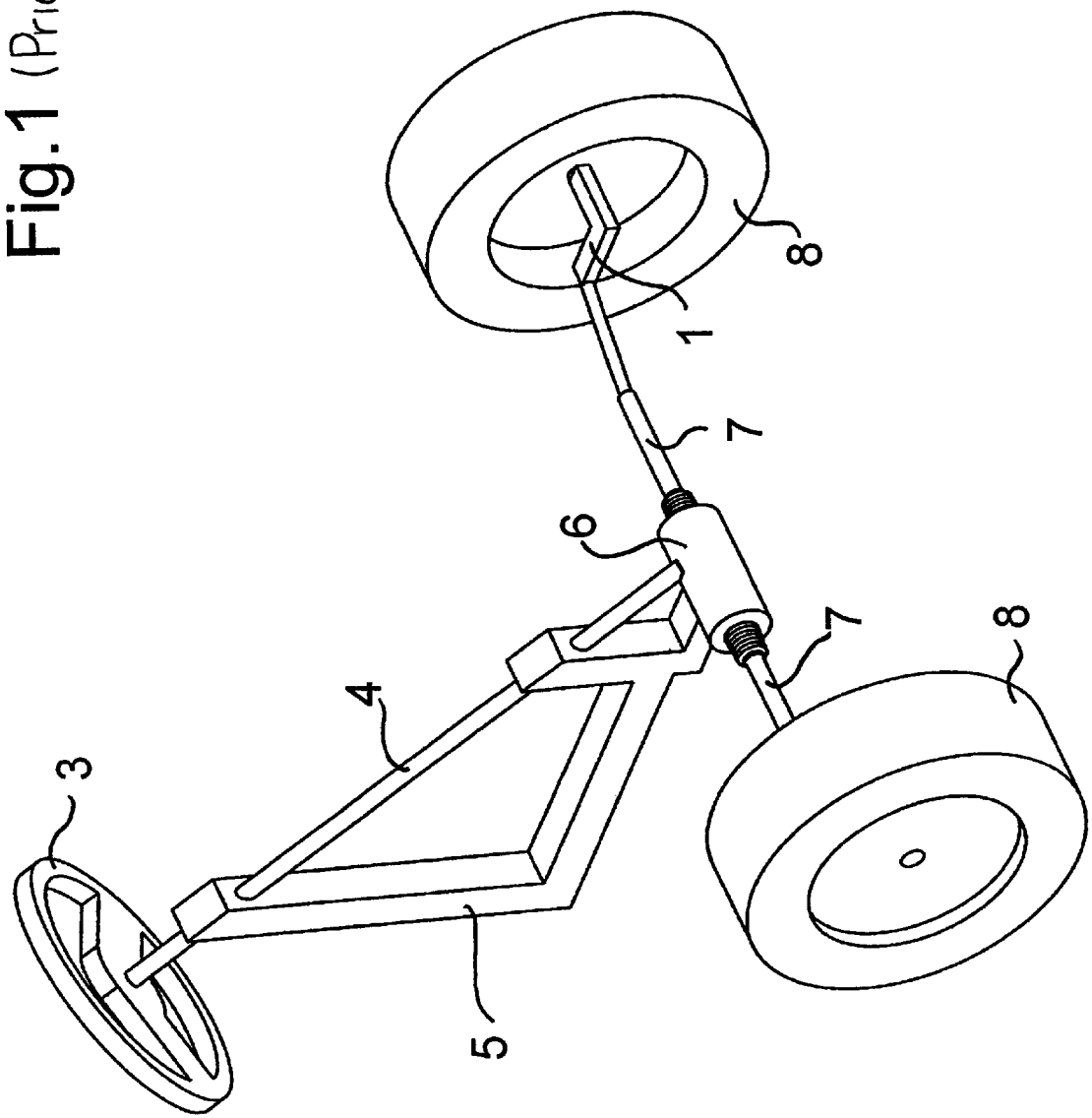
FIG. 1 shows, in a schematic and highly simplified illustration, the design of a conventional vehicle steering system without the actuator of the invention.

Shown in FIG. 1 is a schematic, considerably simplified illustration of a conventional vehicle steering assembly. A steering angle, which is set by a steering wheel 3, is transmitted via a steering column 4, which is mounted and guided inside schematically illustrated holding means 5, to a conventional steering gearbox 6 not shown in detail in the drawing. Inside the steering gearbox 6, the steering angle is converted to a translatory movement, which is converted via schematically illustrated steering tie rods 7 and steering knuckle arms into a steering deflection at the wheels 8.

Figure 2:
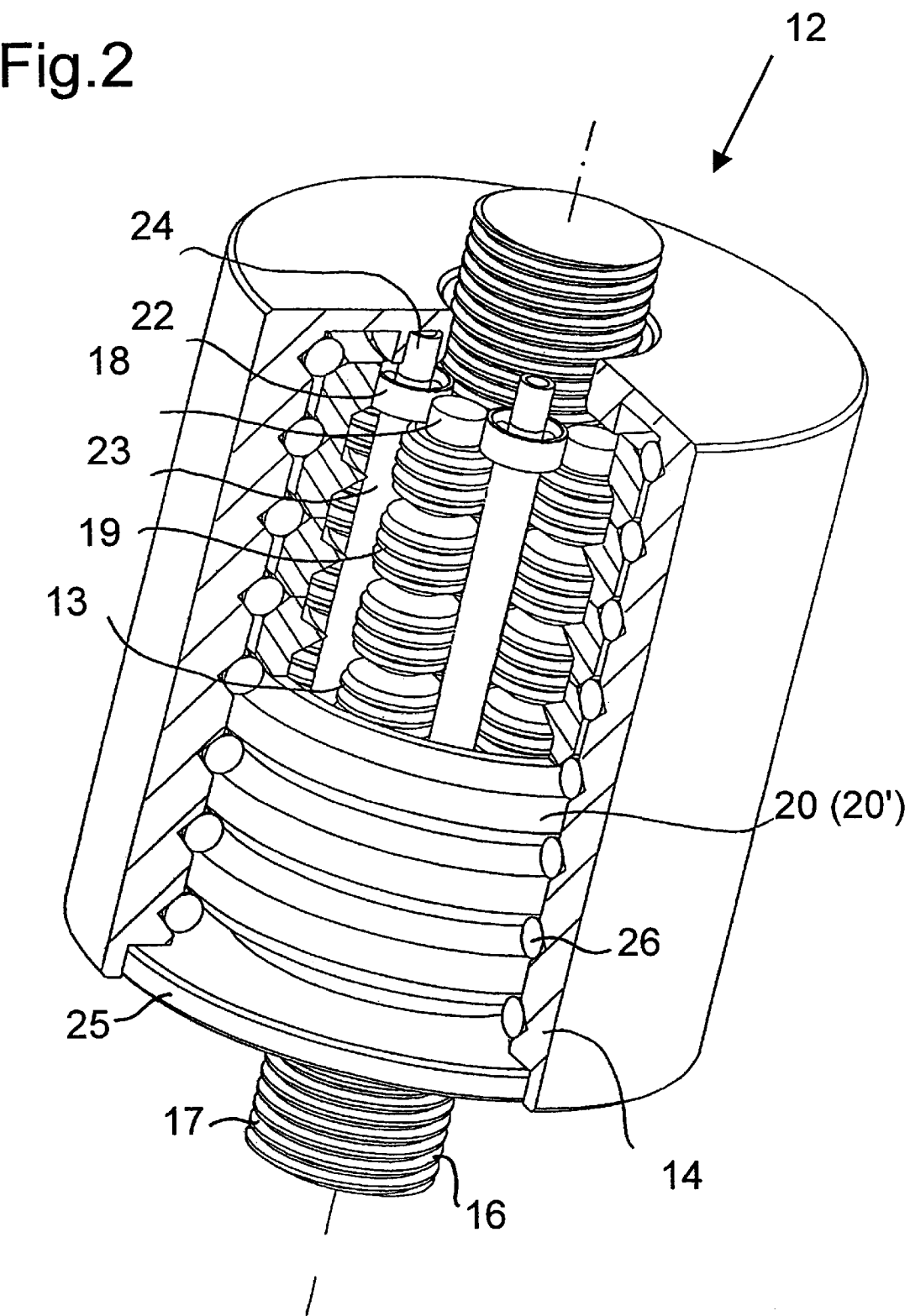
FIG. 2 shows a partly cut open constant-pitch planetary rolling-contact threaded-spindle gear (constant-pitch PRCTS gear)

FIG. 2 shows a partly cut open constant-pitch planetary rolling-contact threaded-spindle gear (constant-pitch PRCTS gear) 12, which, in the embodiment of FIG. 2, has a spindle rod 16, which is provided with a single-flight or multi-start fine-pitch thread 17 and surrounded by a number of rollers or rolling elements 18. The rollers or rolling elements 18, whose number may be selected arbitrarily, are preferably equally spaced. The constant-pitch PRCTS gear 12 shown in FIG. 2, for example, has eight rollers. The rollers or rolling elements 18 have a groove profile 19, which matches the fine thread 17 of the spindle rod 16.

A force entering the spindle rod 16 will transfer from the single-flight or multi-start fine spindle-rod thread 17 to the roller profile 19, which is formed on the rollers and rolling elements 18 in sections of adjacent, parallel grooves. The force is transferred by slide contact, via guide grooves 13 with V-shaped cross section and spherical or straight flanks, which are provided on the rollers or rolling elements 18, to a number of guide rings 20 or a guide element 20'. The guide rings 20 or guide element 20' are run inside the spindle nut 14 by means of ball bearing or roller bearing rings 26, or also according to the revolving-ball principle or revolving-roller principle, so that no forces and/or torques occurring in circumferential direction can be transferred between the guide rings 20 or guide element 20' and the spindle nut 14.

For the contact bearing of the rollers or rolling elements 18, and to keep the spacing between the rollers or rolling elements 18 constant, ball bearings or roller bearings 22 are provided, which are held directly inside the spindle nut 14 via pins 23 and bushings 24. The ball bearings or roller bearings that are located immediately across from the ball bearings or roller bearings 22, are guided via bushings not shown in FIG. 2 inside a spindle cover 25.

By providing the above-described guide rings 20 or the guide element 20', as well as the ball bearings or roller bearings 22, no slip can occur between the fine thread 17 of the spindle rod 16 and the guide grooves 13 of the rollers or rolling elements 18. Furthermore, the possibility of pitch errors due to slip or other reasons has been eliminated.

Figure 3A:
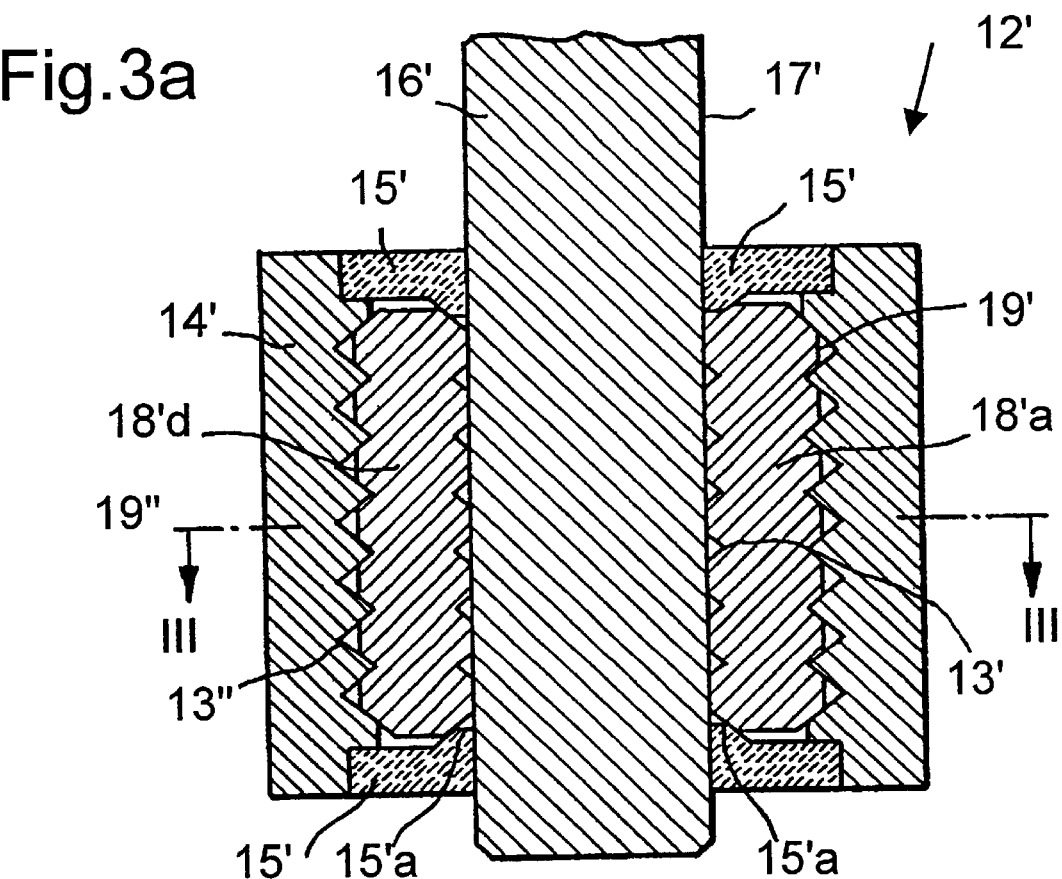
FIG. 3a shows an axial sectional view of a planetary rolling-contact threaded-spindle gear (PRCTS gear)
Figure 3B:
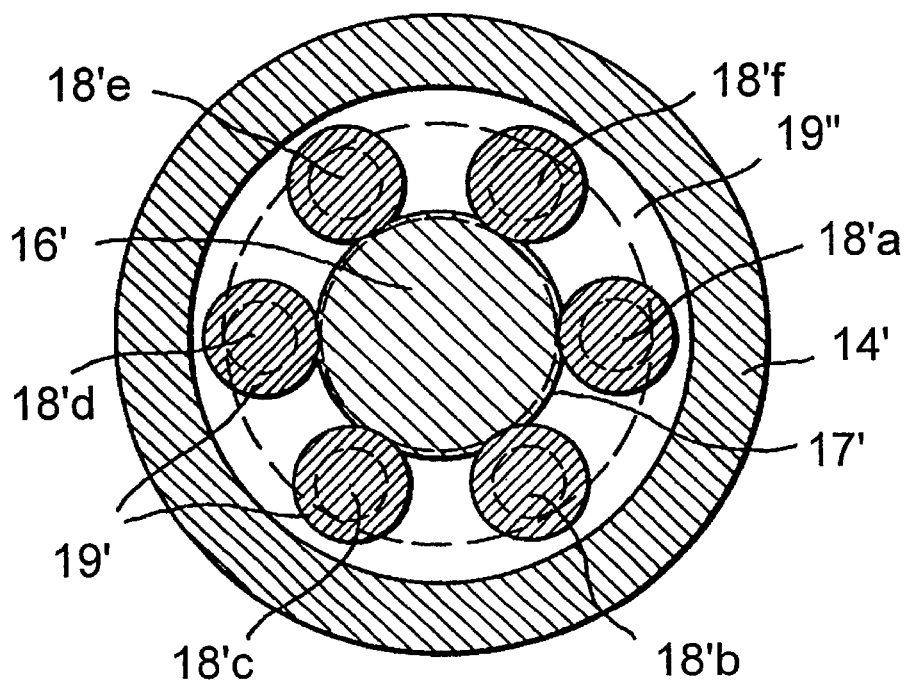

FIGS. 3a and 3b show, in an axial sectional view of a PRCTS gear 12', and centered in a sectional view along line III—III in FIG. 3a, a spindle rod 16' or the end of a shaft designed in the form of a spindle rod, for example the shaft of a drive motor. This type of spindle rod 16' is provided with a single-flight or multi-start fine thread 17'.

Arranged around the spindle rod 16' are a plurality, for example six, rollers or rolling elements 18'a through 18'f in a planetary-type arrangement, as can be seen clearly from the sectional view in FIG. 3b. The rollers or rolling elements 18'a through 18'b are provided, in predetermined sections, with an appropriately fine grove profile 19' of adjacent, parallel grooves with specific sectioning, so that this constant sectioning of the grooves, along with their depth, guarantees an accurate engagement into the small-pitch thread 17' provided on the spindle rod 16'.

Furthermore, coarse guide grooves 13' with V-shaped cross section are formed on the individual rollers or rolling elements 18'a through 18'f between the sections with the fine groove profile 19'. The sectioning of these guide grooves 13' is exactly the same as that of matching female guide grooves 13" with V-shaped cross section that are formed along the inside of the spindle nut 14'.

To ensure that all six rollers or rolling elements 18' accurately and reliably engage both in the female guide grooves 13" formed inside the spindle nut 14', as well as in the small-pitch spindle rod 16', the fine groove profile 19' on each of the planetary rollers 18' is designed with a partial offset, which is constant from roller to roller and permanently predetermined depending on the total pitch to be attained. This means that analogously designed rollers or rolling elements 18'a through 18'f each have a different sectioning offset with respect to the fine profiles 19' formed in their sections, and must therefore be arranged in a specific sequence, which may be indicated, for example, by a marking on the front side of the individual rollers 18'a through 18'b.

For example, 180 degree of angle lie between the offset of the first groove of the fine groove profile 19' on the roller 18'a shown on the right in FIG. 3a or 3b and the corresponding pitch offset of the first groove on the roller 18'd shown on the left in FIG. 3a or 3b. The sectional view of FIG. 3a shows a cover 15' on the top and bottom, which is provided as a dust cover and holding means and securing device for the rollers or rolling elements 18', said cover 15' having projections 15'a that project toward the interior of the system and whose chamfering corresponds to the respective pitch of the coarse guide grooves 13' on the exterior circumference of the rollers or rolling elements 18'.

Figure 4:
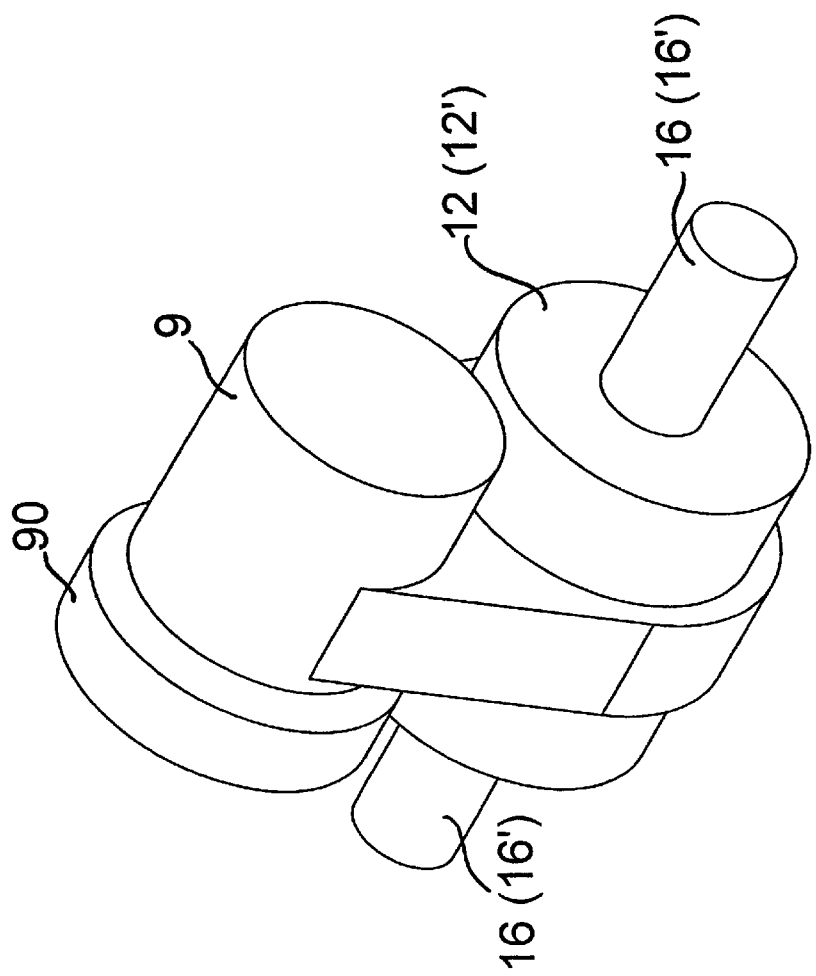
FIG. 4 shows, in a perspective rendering, the constant-pitch PRCTS gear of FIG. 2, or the PRCTS gear of FIGS. 3a and 3b, with an assigned drive unit.

FIG. 4 shows the constant-pitch PRCTS gear, or PRCTS gear 12 or 12', and projecting from its end the spindle rod 16 (16'), whose drive has an assigned electric motor 9, at whose drive side transmission elements 90, which are only shown schematically in the drawing, are provided, for example in the form of cogwheels, which are in a combing engagement not shown in detail in FIG. 4 with the spindle nut 14 (14'). A person skilled in the art knows numerous methods to drive the constant-pitch PRCTS gear or PRCTS gear, to convert a fast rotary motion of an electric motor 9 serving as the drive unit at a low torque into an axial movement with very high force of the spindle rod 16 (16').

Figure 5:
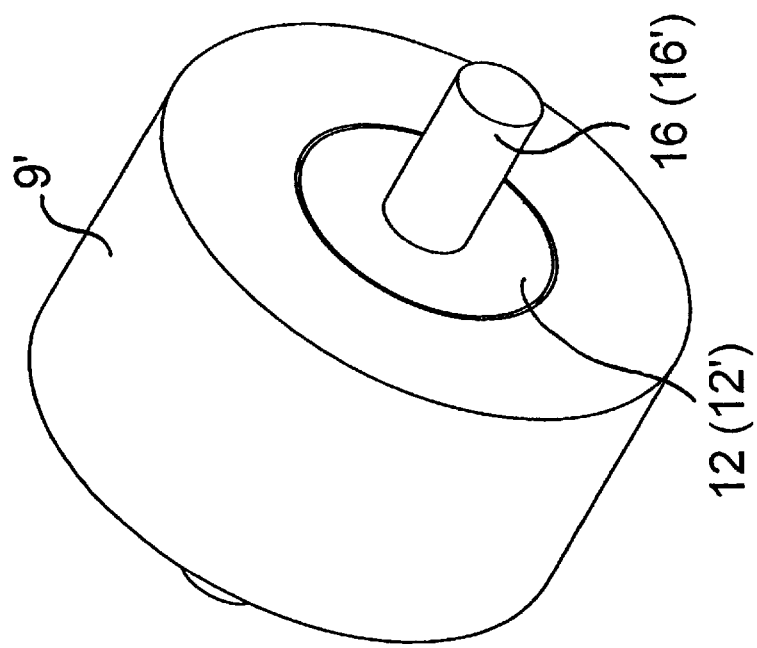
FIG. 5 shows a preferred embodiment of an assembly consisting of a constant-pitch PRCTS gear, or a PRCTS gear, and a drive motor.

FIG. 5 illustrates a preferred embodiment of the constant-pitch PRCTS gear or PRCTS gear 12 or 12', which is positioned inside the rotor of an electric motor 9', and whose spindle rod 16 (16') concurrently forms the axis of the electric motor. The result is a particularly compact and space-saving design of an actuator according to the invention.

Elements in FIG. 6a that correspond to elements of the conventional vehicle steering assembly shown in FIG. 1 are marked with the same reference numerals as in FIG. 1 and are therefore not described again in the following. FIGS. 6a and 6b show a divided steering column 4', with an actuator consisting of the electric motor 9 as the drive and the constant-pitch PRCTS gear or PRCTS gear 12 or 12' provided between the upper and the lower part 4'a and 4'b of the divided steering column 4'. Although the following description and figures always deal with an actuator corresponding to FIG. 4, the actuator shown in FIG. 5 or another comparable embodiment may also be substituted for the one shown in FIG. 4.

At the spindle rod 16 (16') of the spindle gear 12 (12') a schematically illustrated guiding mechanism 2 is provided, by means of which an additional steering angle is applied via a sliding sleeve 10 to the steering angle that is preset by the steering wheel 3. For this purpose, the lower part 4'b of the steering column 4' is radially fixed relative to the sliding sleeve 10 and made axially movable via a splined shaft 32. The lower end of the upper part 4'a of the steering column 4' has a helical gearing 33' and the upper end of the sliding sleeve 10 is designed in the form of a nut with a corresponding helical gearing 33.

As a result, an axial displacement of the sliding sleeve 10 relative to the upper part 4'a of the steering column 4' via a guiding mechanism 2, forces a relative rotation between the two elements and thus between the two parts 4'a and 4'b of the steering column 4'. This relative rotation is used to apply the additional steering angle. If the guiding mechanism 2, which is driven by the spindle rod 16 (16'), is in its resting position, the sliding sleeve 10 can rotate freely inside the guiding mechanism 2 but not shift axially, and a relative twisting between the upper and lower part of the steering column 4' is not possible.

The size of the additional steering angle is computed in a microprocessor 11, for example based on the steering wheel angle and measured vehicle dynamics variables, such as speed, yaw rate and transverse acceleration, using a mathematical control law. A signal corresponding to the respective computed auxiliary angle is then used to actuate the motor 9, which is assigned to the constant-pitch PRCTS gear, or PRCTS gear, 12 or 12', as indicated by a dot-and-dash line between the microprocessor 11 and the electric motor 9 in FIG. 6a and also in the subsequent figures.

Figure 7:
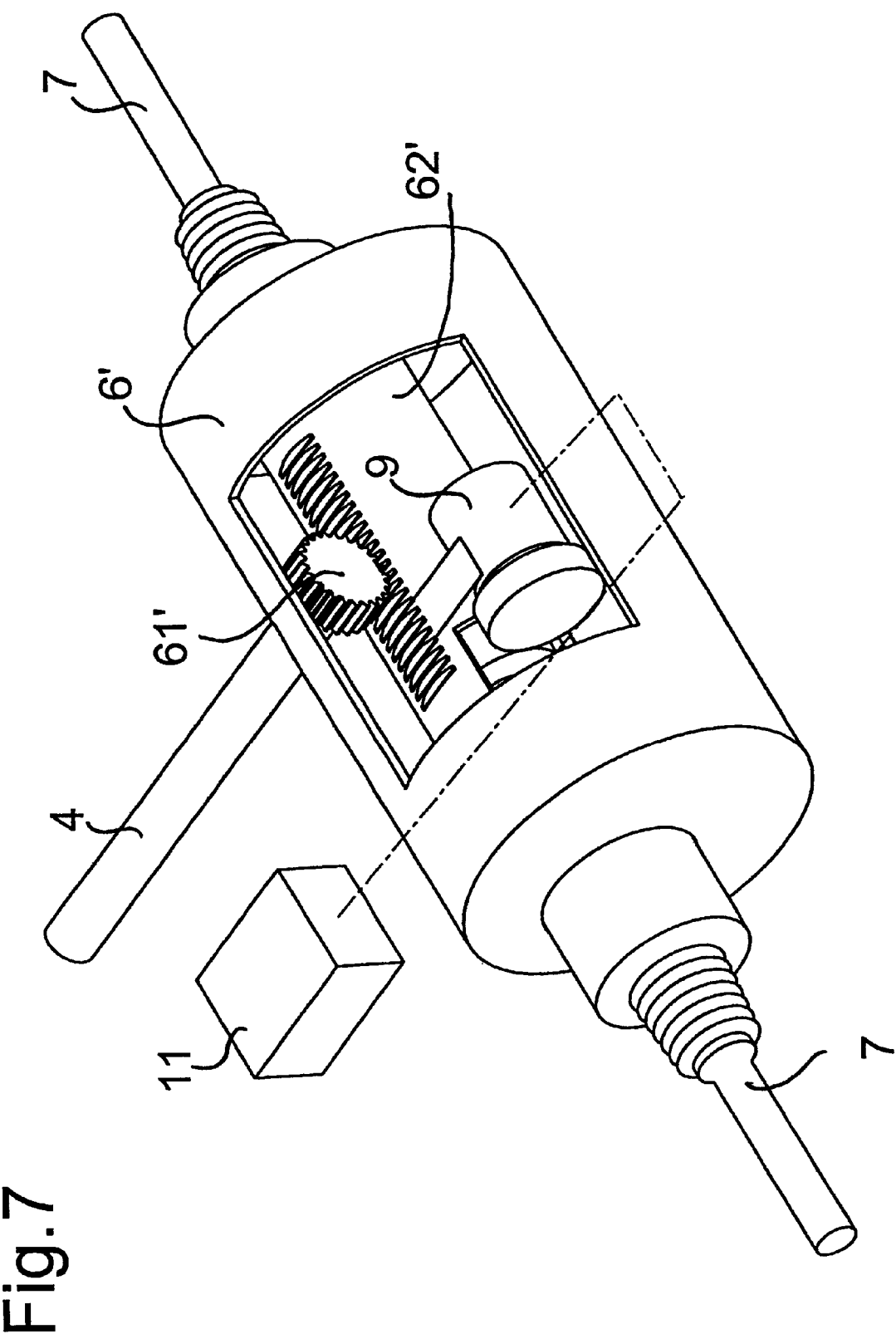
FIG. 7 shows a perspective schematic representation of a section of a steering assembly with a second embodiment of an auxiliary steering system assigned to a conventional steering gearbox.

FIG. 7 illustrates a second embodiment of an auxiliary steering system, which is assigned to a partly cut open conventional rack-and-pinion steering gearbox 6' shown in the perspective. At the end of the steering column 4, which projects into the steering gearbox 6', a cogwheel 61' is mounted, which is in combing engagement with the steering rack 62' of the steering gearbox 6'. In the second embodiment, a constant-pitch PRCTS gear or PRCTS gear (12, 12') of the actuator according to FIG. 4 is integrated into the steering rack 62' of the conventional rack-and-pinion steering gearbox 6'.

When the motor 9 of the actuator in FIG. 4, which is assigned to the constant-pitch PRCTS gear or the PRCTS gear 12 or 12', is actuated via a signal corresponding to the additional steering angle calculated by the microprocessor 11, the rotatory movement of the electrical motor 9 is converted into the corresponding translatory movement, which—via the spindle rod 16 (16') of the spindle gear 12 (12')—causes a corresponding displacement, relative to the steering rack 62', of the steering tie rods 7 that are fastened to the two ends of the spindle rod 16 (16').

In FIG. 8a, the conventional steering assembly of FIG. 1 is altered in that the entire steering gearbox 6" is run on bearings so that it can be displaced in an axial direction relative to schematically illustrated holding means 5". For this purpose the steering gearbox 6" is guided on appropriate radial bearings 35 so that it is moveable in an axial direction and fixed radially. To ensure the kinematic link of the steering column 4 to the steering gearbox 6", appropriate compensation joints are provided for angle and length compensation in the steering column 4, as indicated by a joint 36 in a simplified drawing in FIG. 8a. The steering gearbox 6" has an assigned actuator as shown in FIG. 4. The spindle rod 16 (16') of the spindle gear 12 (12') is furthermore connected to the housing of the steering gearbox 6" via a connecting element 61" as shown in FIG. 8b. The position of the spindle rod 16 (16') is determined by a sensor means 64, which supplies a signal representing that position to microprocessor 11.

As soon as the motor 9 (9') is actuated by the microprocessor 11 via a signal corresponding to the computed additional steering angle, the rotary movement of the motor 9 (9') is converted via the spindle gear 12 (12') into a translatory movement of the spindle rod 16 (16'), which, in turn, via the connecting element 61" fastened to the one end of the spindle rod 16 (16'), causes a displacement of the steering gearbox 6" relative to the holding means 5", thus resulting, via the additional displacement of the steering tie rods 7, in a corresponding correction at the wheels 8 of the steering angle set by the steering wheel 3.

In FIGS. 9a and 9b, an actuator according to FIG. 4, which is housed inside a housing 27, is installed downstream from a steering gearbox 6 via steering tie rods 7 and holder arms 71 that are attached to its steering rack. The two ends of the spindle rod 16 (16') of the spindle gear 12 (12'), which is fixed axially inside the housing 27, are fastened to steering tie rods 7. As soon as the motor 9 of the actuator is actuated via a steering angle correcting signal computed in the microprocessor 11, the steering tie rods 7 are displaced accordingly relative to the housing 27 via the spindle gear 12 (12') of the actuator.

In FIGS. 10a and 10b, auxiliary steering devices in the form of actuators according to FIG. 4, whose motors 9 are in operating contact with the constant-pitch PRCTS gear, or PRCTS gear 12 or 12', are provided between the steering gearbox 6 and the steering tie rods 7. As soon as the motors 9 are actuated via a signal corresponding to the additional steering angle computed in the microprocessor 11, the rotary movement of the motors 9 is converted, via the spindles 12 (12') into a translatory movement causing a corresponding displacement of the steering tie rods 7 relative to the steering rack 62 of the steering gearbox 6, and thus into a corresponding correction at the wheels 8 of the steering angle set by the steering wheel 3.

A special advantage of the last described embodiment is that fact that it offers the possibility to use two actuators to displace the two steering tie rods 7 independently from one another via independently calculated signals sent to the motors 9 by the microprocessor 11. As a result, different additional steering angles may be applied to the two wheels 8 of the steered axle, and specifically also to a steered rear axle of a vehicle.

This offers the potential for utilizing the asymmetric tire characteristics during cornering for an optimized steering control effectiveness. The steering dynamics can furthermore be improved and tire wear can be reduced with a toe-in of the steered axle that is adapted to the operating conditions (e.g., driving speed) via appropriate additional steering angles.

FIGS. 11a and 11b show a sixth embodiment of an auxiliary steering system, which is installed following the steering gearbox 6 by means of a lever mechanism 73. For this purpose, the spindle gear 12 (12') is connected to the steering rack 62' of the steering gearbox 6 via a U-shaped supporting frame 74. The addition of the displacement of the steering rack 62" and the displacement of a spindle rod (not shown in FIGS. 12a and 12b) of the spindle gear 12 (12'), which is reduced by the lever mechanism 73, results in a displacement of the steering tie rods 7.

The embodiments described based on FIGS. 8a through 11b can all be applied also to axles that are not mechanically steered via the steering wheel, if a steering wheel angle generated by the steering wheel is set to zero and the resulting simplifications are taken into consideration in the design as appropriate.

In the embodiments described based on FIGS. 8a through 11b, the steering wheel 3, the steering column 4 and the cogwheel 61' are eliminated. The steering rack 62' or 62" and the steering gearbox 6 or 6" are designed as one unit since no relative movement occurs. In this manner the second through fourth embodiments shown in FIGS. 7 through 9b become equivalent solutions since the steering tie rods 7 are displaced directly and exclusively via the drive for the spindle rod 16 or 16' of the actuator. The same holds true for the embodiment shown in FIGS. 11a and 11b, with the difference that the displacement of the spindle rod 16" causes a displacement of the steering tie rods 7, which is reduced via the lever mechanism 73.

FIG. 12 shows a design for an axle that is not mechanically steered from the steering wheel, whose wheels 8 are steerable via steering tie rods 7 and steering knuckle arms 1. The steering tie rod 7 is run axially moveable on bearings along a housing 80 that is connected to a vehicle chassis not shown in the drawing, and it is actuated via an actuator according to the invention comprising a spindle gear 12 or 12' and the electric motor 9. In this manner, a signal calculated by the microprocessor 11 can be used to adjust an appropriate steering angle at the wheels 8 via a displacement of the steering tie rod 7.

Lastly, FIG. 13 shows a design corresponding to the fifth embodiment shown in FIGS. 10a and 10b, for an axle that is not mechanically steered via a steering wheel. At the wheels 8, steering angles corresponding to a signal computed by the microprocessor 11 can be applied by one actuator per wheel, via steering tie rods 7.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expression "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same function can be used; and it is intended that such expressions be given their broadest interpretation.

LIST OF REFERENCE NUMERALS

1 Steering knuckle arm
2 Guiding mechanism
3 Steering wheel
4, 4' Steering column
4'a Lower part of the steering column
4'b Upper part of the divided steering column
5, 5" Holding means
6, 6', 6" Steering gearbox
7 Steering tie rod
8 Wheel
9, 9' Electric motor
10 Sliding sleeve
11 Microprocessor
12, 12' Planetary rolling-contact threaded-spindle (PRCTS) gear
13, 13' Guide grooves
13" Female guide grooves
14, 14' Spindle nut
15' Cover
15'a Projection
16, 16', 16" Spindle rod
17, 17' Single-flight or multi-start fine thread
18, 18'a through Rollers or rolling elements
18'f
19, 19'0 Groove profile
20, 20' Guide rings or guide element
22 Ball bearing or roller bearing
23 Pin
24 Bushing
25 Spindle cover
26 Ball bearing rings or roller bearing rings
27 Housing
32 Spline shaft toothing
33, 33' Helical gearing
35 Radial bearing
36 Joint
61' Cogwheel
61" Connecting part
62', 62" Steering rack
71 Holding arm
73 Lever mechanism
74 Supporting frame
80 Housing

What is claimed is:

1. A vehicle steering system comprising:

components for setting a primary steering angle of a vehicle in response to manual operation by a driver; and an actuator for generating an additional steering angle for the vehicle, said actuator comprising: a microprocessor; an electric motor connected to be controlled by said microprocessor and functioning as a drive; and a gear driven by said electric motor to apply the additional steering angle to at least one axle of the vehicle, wherein said actuator generates the additional steering angle independently of any manual operation by the driver, wherein said gear is a constant-pitch planetary rolling-contact threaded-spindle gear (12) and comprises a spindle rod (16), a spindle nut (14) surrounding the spindle rod, and a plurality of rollers (18) placed around the spindle rod (16), said rollers (18) having a groove profile (19) matching a thread (17) of the spindle (16), said rollers (18) being run on a plurality of guide rings (20) and interposed bearings (22), said rollers (18) being arranged at a fixed distance relative to the spindle nut (14) and from one another.

2. The actuator (9, 12; 9, 12') according to claim 1 wherein the actuator is used to displace an axially slidable steering gearbox (6"), which is connected to the spindle rod (16, 16") of the actuator spindle gear (12, 12") by a connecting part (61"), and along with said axially slidable steering gearbox (6"), steering tie rods (7), which are connected to a steering rack (62') of the steering gearbox (6").

3. A vehicle steering system comprising:

components for setting a primary steering angle of a vehicle in response to manual operation by a driver; and an actuator for generating an additional steering angle for the vehicle, said actuator comprising: a microprocessor; an electric motor connected to be controlled by said microprocessor and functioning as a drive; and a gear driven by said electric motor to apply the additional steering angle to at least one axle of the vehicle, wherein said actuator generates the additional steering angle independently of any manual operation by the driver, wherein said gear is a planetary rolling-contact threaded-spindle gear (12'), comprising:

a spindle rod (16') with a thread (17'), which is surrounded by a spindle nut (14') with a guide profile (13") and a plurality of interposed rollers (18') respectively having a first groove profile (19') matching the thread (17') of the spindle rod (16'), and a second profile (13') matching the guide profile (13") of the spindle nut (14'), each said groove profile overlapping one another and being formed in alternating sections and said rollers (18') being placed at a fixed distance relative to the spindle nut and to one another, and said actuator further comprises a sensor means with control-engineering type feedback assigned to the planetary rolling-contact spindle gear (12') to determine a position of the spindle rod (16').

4. The actuator (9, 12; 9, 12') according to claim 2, wherein the actuator is used to displace an axially slidable steering gearbox (6"), which is connected to the spindle rod (16, 16") of the actuator spindle gear (12, 12") by a connecting part (61"), and along with said axially slidable steering gearbox (6"), steering tie rods (7), which are connected to a steering rack (62') of the steering gearbox (6").

* * * * *